Dec. 17, 1963                A. F. FROUSSARD                3,114,279
                          CRANKSHAFT TRUING DEVICE
Filed Feb. 19, 1962                                      5 Sheets-Sheet 1
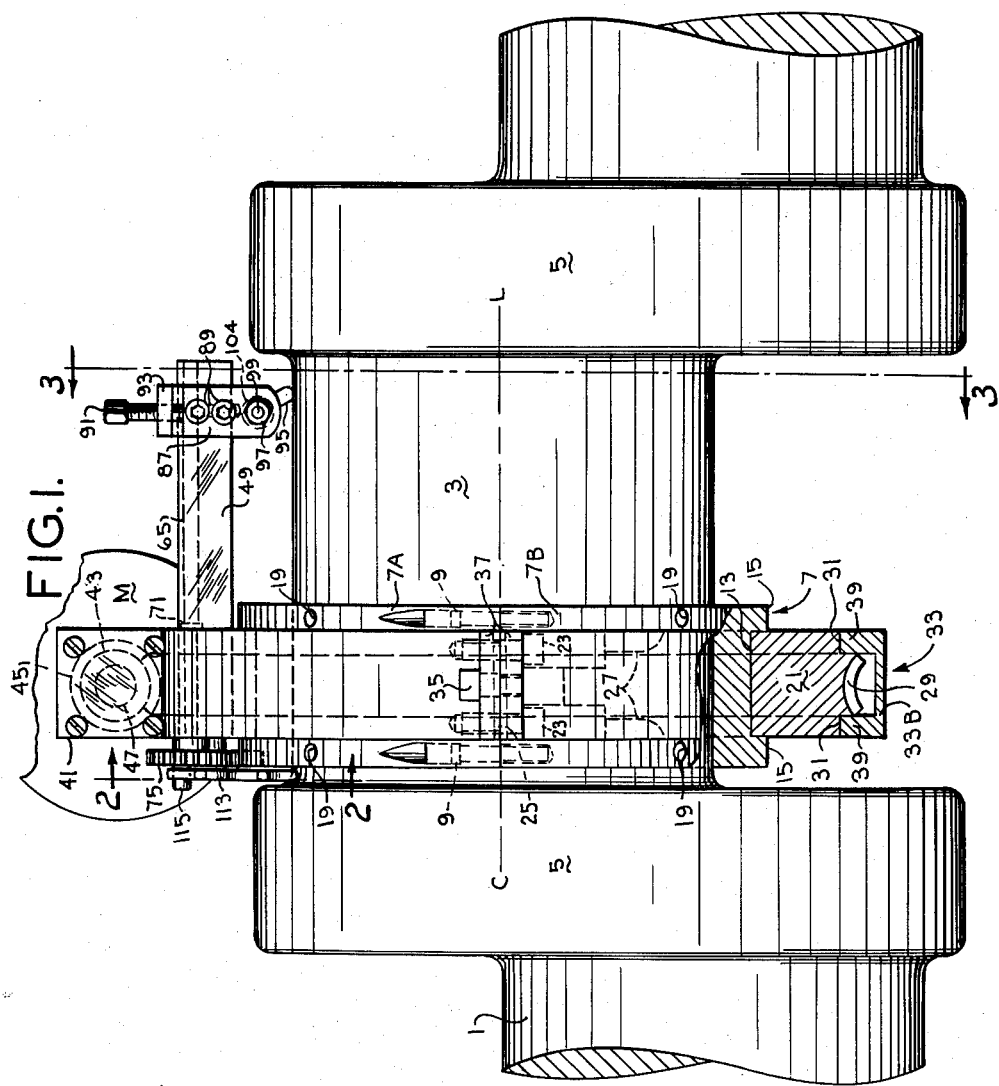
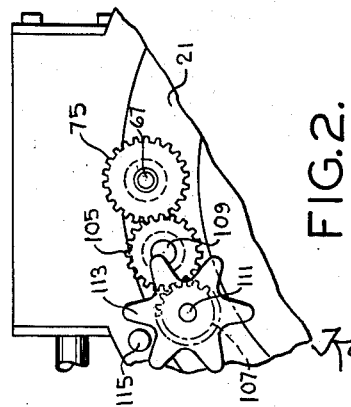
Albert F. Froussard,
          Inventor,
Koenig, Pope, Senniger and Powers,
                        Attorneys.

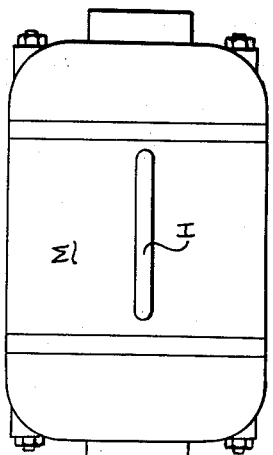
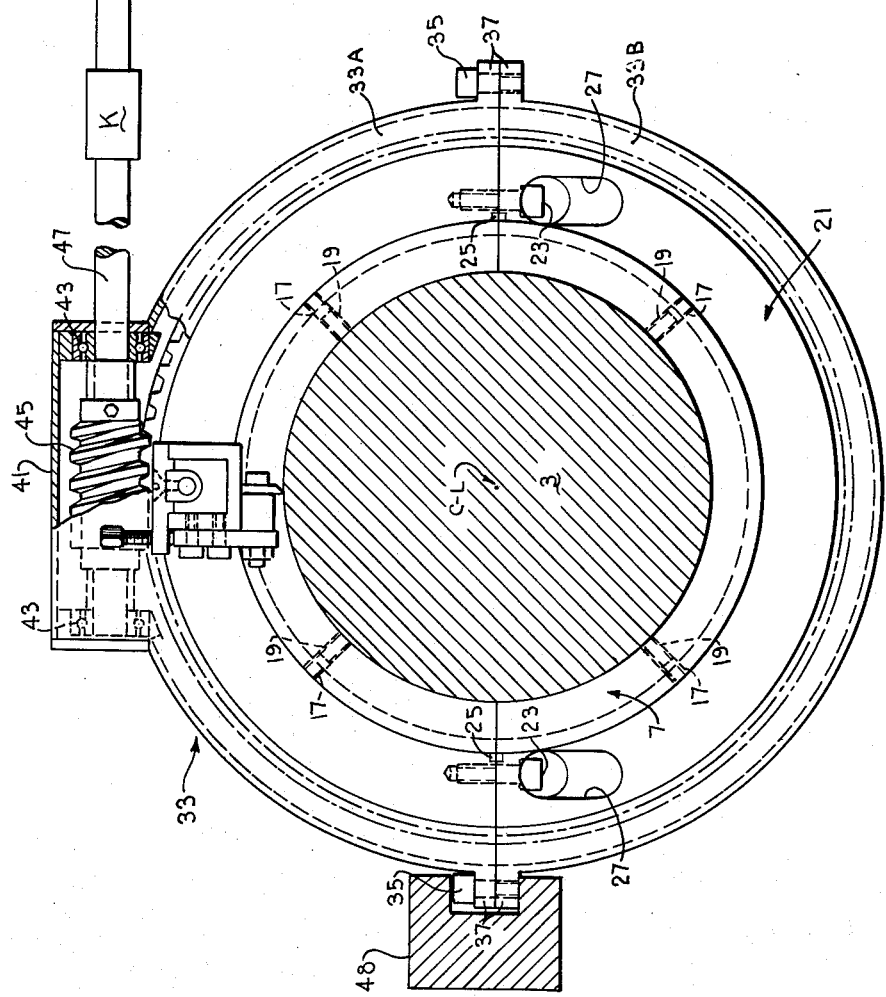
FIG. 3.

Dec. 17, 1963  A. F. FROUSSARD  3,114,279
CRANKSHAFT TRUING DEVICE
Filed Feb. 19, 1962  5 Sheets-Sheet 3
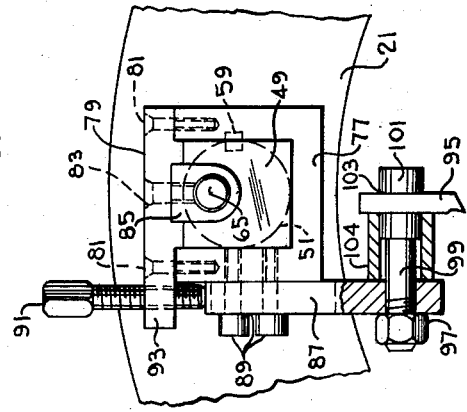
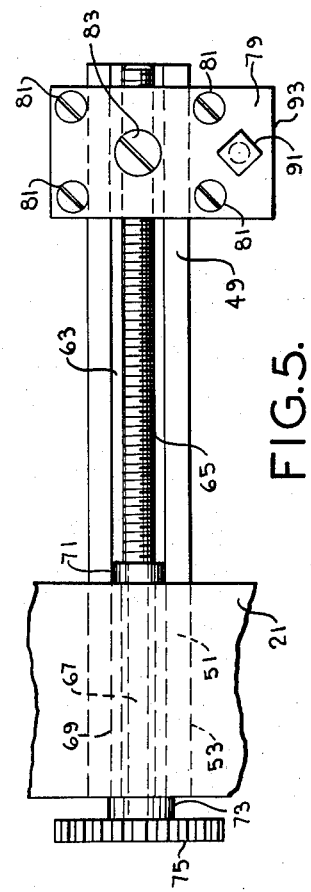
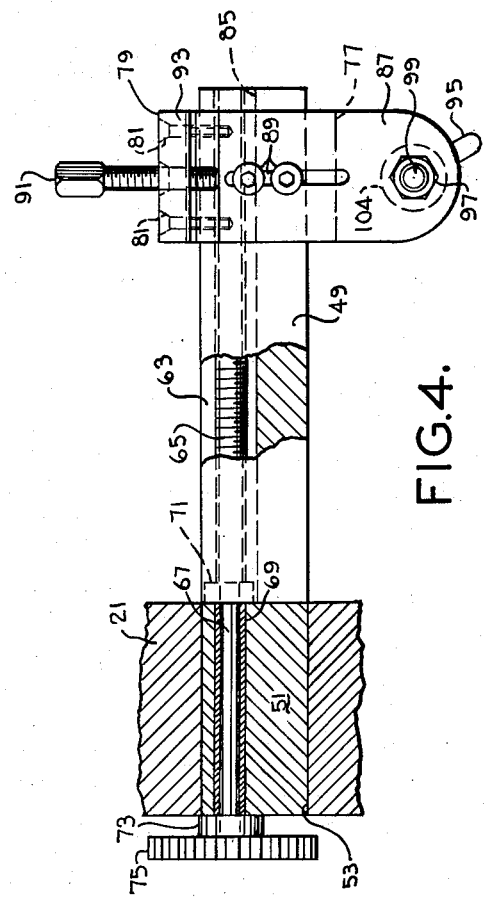

Dec. 17, 1963   A. F. FROUSSARD   3,114,279
CRANKSHAFT TRUING DEVICE
Filed Feb. 19, 1962   5 Sheets-Sheet 5
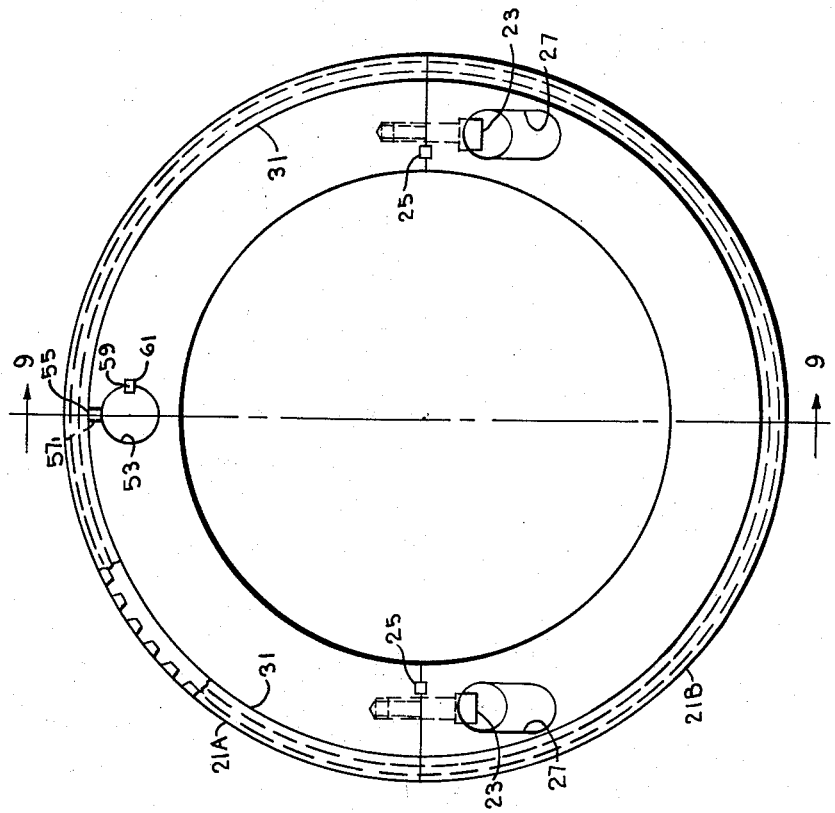
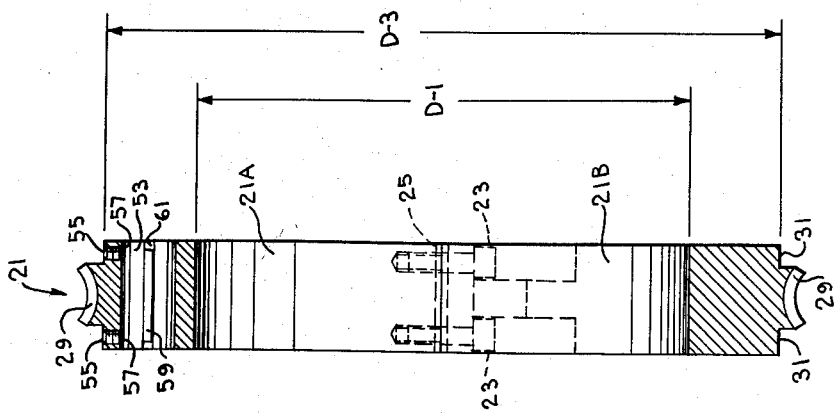

United States Patent Office 3,114,279
Patented Dec. 17, 1963

3,114,279
CRANKSHAFT TRUING DEVICE
Albert F. Froussard, 5432 Jamieson St., St. Louis, Mo.
Filed Feb. 19, 1962, Ser. No. 174,126
1 Claim. (Cl. 82—4)

This invention relates generally to shaft truing devices, and with regard to certain more specific features, to a portable device of this type for truing crankshafts and the like.

Among the several objects of the invention may be noted the provision of a truing device for worn shafts, and more particularly for crankpins of crankshafts; the provision of a portable device of the class described, permitting the truing of larger shafts without necessitating their being transported to distant repair shops for the purpose; the provision of a device of the class described which is light in weight, permitting its convenient transportation to work sites; and the provision of a device of this class which is simple and convenient to operate by machinists of ordinary skills. Other objects and features will be in part apparent in part pointed out hereinafter.

The invention accordingly comprises the elements and combinations of elements, features of construction, and arrangements of parts which will be exemplified in the constructions hereinafter described, and the scope of which will be indicated in the following claim.

In the accompanying drawings, in which one of various possible embodiments of the invention is illustrated, FIG. 1 is a side elevation showing the device assembled on a crankpin;

FIG. 2 is a fragmentary cross section taken on line 2—2 of FIG. 1;

FIG. 3 is a cross section taken on line 3—3 of FIG. 1;

FIG. 4 is an enlarged side elevation of tool guide parts shown in FIG. 1;

FIG. 5 is a plan view of FIG. 4;

FIG. 6 is a right-end elevation of FIG. 4;

FIG. 9 is an axial section of a split but assembled ring gear, being taken on line 9—9 of FIG. 10; and FIG. 10 is a right-end view of FIG. 9.

Corresponding reference characters indicate corresponding parts throughout the several views of the drawings.

Sometimes comparatively large crankshafts and the like become worn and out-of-round in service and require reconditioning. In view of their bulk it is costly to remove and transport them to distant repair shops adequately equipped for recentering or truing them. The present invention provides an economical truing tool which may be conveniently transported to the side of the shaft for truing operations.

Figure 8:
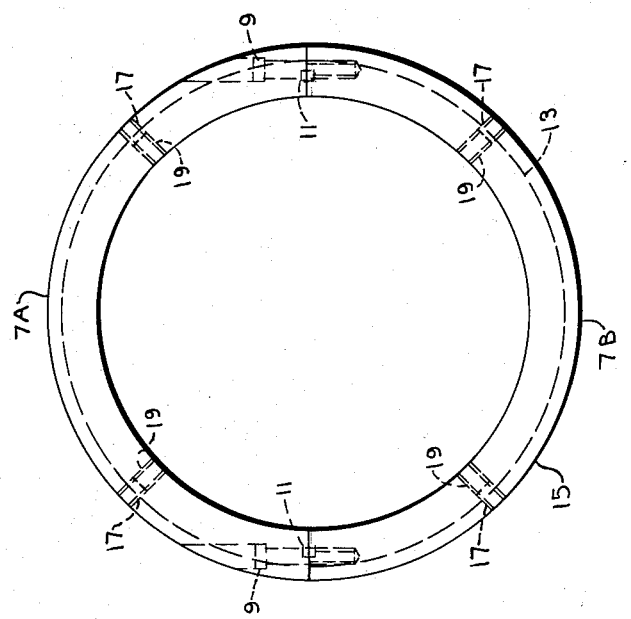
FIG. 8 is a right-end view of FIG. 7.
Figure 7:
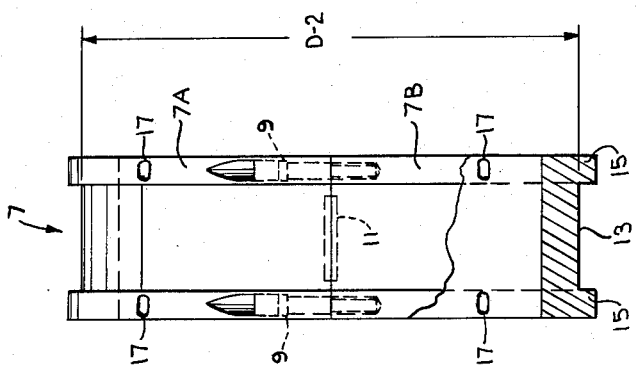
FIG. 7 is a side elevation of a split but assembled guide ring, parts being shown in section.

Referring now more particularly to FIG. 1, there is shown at numeral 1 a crankshaft having a crankpin 3 between crank cheeks 5. For the purpose of this disclosure it may be assumed that the crankpin 3 has been worn out-of-round with respect to its original center line CL. At 7 is shown a split two-part guide ring further detailed in FIGS. 7 and 8. This guide ring consists of two separable, semicircular segments 7A and 7B. When assembled, they are joined by threaded cap screws 9, being held in accurate circular alignment by keys 11. The cross sections of the segments 7A and 7B are such that a central groove-forming cylindrical portion 13 is provided, transversely flanked by radial flanges 15.

Passing through each flange 15 of each segment 7A and 7B is a pair of threaded holes 17 for the reception of set screws 19 (FIG. 3). For assembly, separate semicircular segments 7A and 7B are brought into position around one end of the crankpin 3 and then keyed and bolted together, as shown in FIG. 1. The set screws 19 are then adjusted against the pin 3 so as to bring the circular form of the resulting ring assembly 7 into collinear or concentric relationship with the original center line CL of the pin 3. It is possible to do this without great difficulty because a worn shaft generally has left on its surface a sufficient extent of concentric circularity that the same may be used as a guide in obtaining the desired concentricity; but even in the absence of such a fact, a normally skilled machinist can, by suitable adjustment of the set screws 19, bring about sufficient concentricity. When the combined unit of segments 7A and 7B is brought into concentric relationship with the original center line, one portion of the inner periphery of the unit will be closer to the periphery of the shaft than another portion of the inner periphery of the unit.

Referring now to FIGS. 1, 3, 9 and 10, numeral 21 indicates a split ring gear in the form of a worm wheel made in semicircular segments 21A and 21B, adapted to be held together by cap screws 23 and held in alignment by keys 25. Openings 27 are provided for admitting and removing the cap screws 23. The inside cylindrical diameter D-1 of the worm wheel 21 approximately matches the outside cylindrical diameter D-2 of cylindrical surface 13 in the groove of the guide ring 7 (compare FIGS. 7 and 9), so as to provide an accurately running fit. The portions of the ring gear 21 carrying its teeth 29 are flanked by shoulders 31 of diameter D-3. Separate segments 21A and 21B of the ring gear 21 may be engaged with the groove of the guide ring 7 (between flanges 15) and then keyed and bolted together. Thus the assembled ring gear 21 becomes positioned in the groove of the guide ring 7 and is freely rotatable thereon.

At numeral 33 is shown a two-part split reaction and housing ring having semicircular segments 33A and 33B which may be bolted together by cap screws 35 in ears 37. In FIG. 1 the cross section of segment 33B is shown. It will be understood that the general inner cross-sectional from of segment 33A is the same. Each cross section includes inward flanges 39 (FIG. 1) which engage the shoulders 31 on the diametral part D-3 of ring gear 21 (compare FIGS. 1 and 9). Thus the separate segments 33A and 33B may be placed in position surrounding the ring gear 21 and bolted together to form an accurate running fit for the latter within the reaction ring 33.

The upper segment 33A of the reaction ring 33 has organized with it, as by welding or the like, a container 41 carrying bearings 43 for a worm gear 45. The worm gear 45 is affixed to a drive shaft 47 which connects with the rotor of a motor M. The casing of the motor, which carries its stator, is provided with suitable handle or grip means, one element of which is shown at H, so that it may be held against rotation. The motor as a whole is supported on shaft 47 and requires no independent support, but one may be provided if desired. Instead of the motor M, a flexible cable drive or the like may be employed to drive shaft 47.

It will be seen by reference to FIG. 3 that if the reaction ring 33 is held, as for example by means of a fixed jaw 48, and the motor M excited, the worm gear 45 will drive the worm wheel 21 around the guide ring 7. The reaction on the motor frame for driving may be provided at the grip H. Under some circumstances it is possible to drive the ring gear 21 without the use of the jaw 48, the operator simply holding the stator of the motor M against rotation around the axis of shaft 47 and against rotation around the center line CL. In any event, its housing must be held against rotation around the center line of shaft 47. Shaft 3 is itself held against rotation by suitable means (not shown).

The purpose of the ring gear 21 is to revolve a tool bar around the center line CL, such as shown in detail in FIGS. 4–6. The tool bar comprises an essentially square cantilever guide bar 49, terminated by a cylindrical supporting section 51, the latter fitting into a hole 53 in the ring gear 21. As will be seen from FIG. 3, the tool bar is shorter in length than the distance between the crank cheeks 5 so that it will pass between the cheeks as it revolves around the crankpin 3 in a manner to be described. By the use of set screws 55 in threaded holes 57, the bar 49 is held rigidly. A key 59 in a keyway 61 holds the bar 49 in proper aspect on the ring gear 21, as shown in FIGS. 4–6. The cantilever portion 49 is grooved, as shown at 63, for the reception of a lead screw 65, the left-hand end of which is unthreaded and reduced in diameter, as shown at 67. This reduced portion 67 is located in a bearing liner 69 passing through a hole in the circular part 51. Collars 71 and 73 at opposite ends of the reduced section 67 prevent axial movement of the lead screw 65, although it may rotate. A gear 75, attached to the reduced section 67, turns the lead screw 65.

Referring to FIG. 6, there is shown at 77 a U-shaped slider part embracing the square cantilever section 49. A cap 79, held by screws 81 to the member 77, supports member 77 on section 49. Members 77 and 79 form a sliding collar around the square extension 49. Attached by a screw 83 to cap 79 is a replaceable threaded nut 85 which is located slidably in the groove 63 and through which the screw 65 is threaded. Thus it will be seen that if the screw 65 is rotated relative to the bar 49, the joined parts 77, 79 and 85 will slide along the bar 49. These parts 77, 79 and 85 constitute a movable support for a tool bar 87, supported for vertical adjustment by means of a slot and bolt arrangement 89. A backing screw 91, threaded through an overhanging tongue 93 from member 79, serves positively to hold the tool bar 87 in any adjusted position. A cutting tool 95 is fastened relatively to the tool bar 87 by action of a nut 97 on a draw bolt 99. Bolt 99 has a head 101 slotted at 103 for lateral reception of the tool 95 and the forcing of the same against a thimble 104. The bolt 99 is located in the thimble 104. When the nut 97 is loose, the tool 95 may be adjusted into any desired angle. Then when the nut 97 is tightened, the bolt 99 tightens the tool against the thimble 104, which is drawn against the tool bar 87.

Referring to FIG. 2, it will be seen that gear 75 meshes with an idler gear 105, which in turn meshes with a gear 107, these gears being carried on suitable fixed gudgeons 109 and 111, respectively, extending from the ring gear 21. Fastened to gear 107 is a six-toothed star wheel 113, the teeth of which successively engage a fixed pin 115 extending from the upper segment 33A of the reaction ring 33. The outside diameters of gears 75 and 105 are such that as these gears revolve with the split ring gear 21, they will pass under the pin 115. Thus for each rotation of the ring gear 21 around the center line CL, the star wheel 113 is rotated a fraction of a turn, which rotates the lead screw 65 a fraction of a turn. This advances the tool supporting members 77, 79, 85 axially with respect to the center line CL, the cutting tool 95 likewise moving axially.

Operation is as follows, assuming a worn crankpin 3:

First, the segments 7A and 7B of split guide ring 7 are assembled around the crank pin 3 at one end adjacent the left-hand cheek 5. The set screws 19 are adjusted in the threaded holes 17, so as to locate the cylindrical groove-forming surface 13 concentrically as closely as possible to the center line CL. Then the two sections 21A and 21B of the ring gear 21 are clamped together in running position around the guide ring 7. It may be assumed that at this time the tool supporting members shown in FIGS. 4–6 have been bracketed on the ring gear 21, and that the gears 75, 105, 107, as well as the star wheel 113, are in place on the ring gear segment 21A. Next the two segments 33A and 33B of the reaction ring 33 are clamped together around the ring gear 21. The motor M (or other driving means) is then attached to shaft 47. In the case of motor M this is accomplished through a coupling illustrated at K.

Next the tool 95 is brought into cutting position adjacent the right-hand cheek 5 by manually turning the star wheel 113 and by adjusting the tool clamping parts 87, 91 and 99. Then the stator of the motor M is held and the motor is excited, whereupon the ring gear rotates, carrying with it the bracketed tool 95, which rotates and cuts the crankpin 3 concentrically. Upon each full rotation, contact of the star wheel 113 with the stationary pin 115 advances the tool axially toward the left. Thus one or more cuts may be taken until the desired truing result is obtained. Then the device is disassembled and reversed in position on the crankpin 3, the guide ring 7 being then supported on the right-hand trued-up portion of pin 3, the remainder of the shaft being trued by movement of the tool from the left-hand cheek toward the center until the diameter of the left-hand portions equals that of the right-hand portions. The tool may then be removed. Although the crankpin 3 will be of smaller diameter than it was originally, the difference may be taken up by suitable replacement bearing liners in the connecting rod that is connected with the pin 3.

While the star wheel 113 is shown as having six projections to produce one-sixth of a revolution for each contact with the pin 115, it will be understood that other numbers of projections and other gear trains (such as 75, 105, 107) having other train values may be used so as to change the axial advance of the tool 95 for each revolution of the worm wheel 21.

It will be noted that if it is desired to relieve the operator of the task of holding motor M against revolving around center line CL, the clamp 48 may be employed. It will be understood that in any event he would need to hold the frame M against rotation around the center line of 47. If desired, a suitable bracket may be employed to hold the motor casing against all movement; but such an arrangement is sometimes difficult to manage in cramped quarters. Even the employment of the jaw 48 may involve complications, but in such event the operator often can hold the motor frame against both movements about the axes of shaft 47 and pin 3.

While the device has been described for truing operations on a crankpin, it will be understood that it is also applicable to step-by-step truing operations on any shaft. Adaptations may be made to shafts of various diameters by interchanging guide rings such as 7 having various inside diameters.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

A cutting assembly for truing worn crankpins located between opposite crank cheeks, comprising a two-part guide ring having a peripheral groove and including clamp means for holding its parts on the crankpin adjacent either cheek, radially operative set screws in the guide ring parts for rigidly holding and centering the complete ring around the center line of a worn crankpin, the width of the complete ring being less than one-half the distance between said cheeks, a two-part split worm-type ring gear adapted for encirclement around said guide ring and location in said groove, means for fastening the parts of the ring gear for running engagement in the guide ring groove, a two-part split reaction housing, fastening means for said housing parts for holding the housing in running encirclement around the ring gear, the widths of the ring gear and housing parts being no greater than the guide ring width, a worm gear meshing with the ring gear, one part of said ring gear housing carrying a housing for said worm gear, a motor-driven drive shaft extending from the worm gear to the outside of the worm gear housing, a cantilever guide bar extending rigidly from the ring gear, the length of which bar is shorter than the distance between the said cheeks, a slidable tool support on the tool bar and including a nonrotatable but axially slidable nut for driving it along the bar, a cutting tool on the tool support, a lead screw threaded through said nut and having an unthreaded rotatable extension borne in the split ring gear, a drive means for said extension and lead screw including a star wheel, and a projection on the reaction housing engageable by said star wheel intermittently to rotate said extension and screw as the worm gear rotates, said guide ring being reversible in position adjacent said opposite cheeks to permit truing by said cutting tool of substantially the entire length of the crankpin between cheeks upon application of the assembly in each of two opposed positions on the crankpin adjacent said crank cheeks.

References Cited in the file of this patent

UNITED STATES PATENTS

| | | |
|---|---|---|
| 971,753 | Hunt | Oct. 4, 1910 |
| 1,417,621 | Marsh | May 30, 1922 |
| 1,980,922 | Kinzbach | Nov. 13, 1934 |
| 2,201,664 | Ferguson | May 21, 1940 |